(12) United States Patent
Rohanna et al.

(10) Patent No.: US 10,138,124 B2
(45) Date of Patent: Nov. 27, 2018

(54) TREATING SULFURIC ACID

(71) Applicant: Rohm and Haas Company, Collegeville, PA (US)

(72) Inventors: John C. Rohanna, Royersford, PA (US); Alfred K. Schultz, Maple Glen, PA (US)

(73) Assignee: ROHM AND HAAS COMPANY, Collegeville, PA (US)

(*) Notice: Subject to any disclaimer, the term of this patent is extended or adjusted under 35 U.S.C. 154(b) by 0 days.

(21) Appl. No.: 15/562,122

(22) PCT Filed: Mar. 28, 2016

(86) PCT No.: PCT/US2016/024486
§ 371 (c)(1),
(2) Date: Sep. 27, 2017

(87) PCT Pub. No.: WO2016/160684
PCT Pub. Date: Oct. 6, 2016

(65) Prior Publication Data
US 2018/0079645 A1 Mar. 22, 2018

Related U.S. Application Data

(60) Provisional application No. 62/140,786, filed on Mar. 31, 2015.

(51) Int. Cl.
| | |
|---|---|
| *C01B 17/90* | (2006.01) |
| *B01D 15/00* | (2006.01) |
| *B01J 20/20* | (2006.01) |
| *B01J 20/28* | (2006.01) |
| *B01J 20/34* | (2006.01) |
| *B01D 15/20* | (2006.01) |

(52) U.S. Cl.
CPC ............ *C01B 17/90* (2013.01); *B01D 15/203* (2013.01); *B01J 20/20* (2013.01); *B01J 20/28004* (2013.01); *B01J 20/28016* (2013.01); *B01J 20/28059* (2013.01); *B01J 20/28061* (2013.01); *B01J 20/28064* (2013.01); *B01J 20/28066* (2013.01); *B01J 20/3416* (2013.01); *C01B 17/905* (2013.01); *C01P 2006/80* (2013.01)

(58) Field of Classification Search
CPC ....... B01D 15/00; C01B 17/90; C01B 17/905; B01J 20/3416; B01J 20/28066; B01J 20/28064; B01J 20/28061; B01J 20/28059; B01J 20/28016; B01J 20/28004; B01J 20/20; C01P 2006/80
See application file for complete search history.

(56) References Cited

U.S. PATENT DOCUMENTS 1,898,688 A  2/1933  Rose

FOREIGN PATENT DOCUMENTS

| CN | 102174212 A | 9/2011 | |
|---|---|---|---|
| GB | 935877 A | 9/1963 | |
| GB | 1284249 A | 8/1972 | |
| JP | S4929434 B1 * | 8/1974 | ............ C01B 17/90 |

OTHER PUBLICATIONS

CABOT, "Activated Carbons and What They Can Do for You", CABOT Norit Activated Carbon, Chemicals, pp. 1-12, cabotcorp.com (2013).
"Studies of the Application and Removal of Powdered Activated Carbon at the City of Chicago Water Department's Jardine and South Water Purification Plants", City of Chicago Water Department, pp. 1-6, http://www.h2oc/pdfs/Chicago.pdf (1996).
Yacob, et al., "Comparison of Various Sources of High Surface Area Carbon Prepared by Different Types of Activation", The Maylaysian Journal of Analytical Sciences, vol. 12, No. 1, pp. 264-271 (2008).
Tsai, et al., "Characterization and adsorption properties of diatomaceous earth modified by hydrofluoric acid etching", J. Colloid and Interface Science, vol. 297, pp. 749-754 (2006).

* cited by examiner

*Primary Examiner* — Timothy C Vanoy
(74) *Attorney, Agent, or Firm* — Kenneth Crimaldi

(57) ABSTRACT

Provided is a method for treating sulfuric acid comprising the step (I) of bringing said sulfuric acid into contact with a collection of solid particles (B) having BET surface area of 50 m$^2$/g to 5,000 m$^2$/g and having volume-average particle diameter of 200 μm or less.

6 Claims, No Drawings

TREATING SULFURIC ACID

It is often desired to react a copolymer with sulfuric acid. A common method for conducting such a reaction is to form a mixture that contains the copolymer and sulfuric acid, to heat the mixture for a time, and then separate the resultant resin from the sulfuric acid. After performance of such a method, the sulfuric acid is known as "spent" sulfuric acid. During reaction with the copolymer, the sulfuric acid often acquires impurities that make the spent sulfuric acid undesirable for further use. Some of those impurities impart color to the sulfuric acid.

The publication "Activated Carbons and What They Can Do For You," by the Cabot Corporation, states that activated carbon is used for treating materials including glycerin, organic acids, and agrochemicals. It is desired to identify a process for removing impurities from sulfuric acid.

The following is a statement of the invention.

An aspect of the present invention is a method for treating sulfuric acid comprising the step (I) of bringing said sulfuric acid into contact with a collection of solid particles (B) having BET surface area of 50 m²/g to 5,000 m²/g and having volume-average particle diameter of 50 µm or less.

The following is a detailed description of the invention.

As used herein, the following terms have the designated definitions, unless the context clearly indicates otherwise.

"Resin" as used herein is a synonym for "polymer." A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers").

Copolymers may have the various types of repeat units arranged randomly, in sequence, in blocks, in other arrangements, or in any mixture or combination thereof. Polymers have weight-average molecular weight of 2,000 or more.

Molecules that can react with each other to form the repeat units of a polymer are known herein as "monomers." The repeat units so formed are known herein as "polymerized units" of the monomer.

Vinyl monomers have the structure

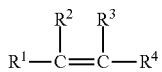

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers have molecular weight of less than 2,000. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate and acrylic monomers. Acrylic monomers are monomers selected from (meth)acrylonitrile, (meth)acrylic acids, alkyl esters of (meth)acrylic acid, amides of (meth) acrylic acid, vinyl chloride, halogenated alkenes, and mixtures thereof. As used herein, the prefix "(meth)acryl-" means either acryl- or methacryl-. "Substituted" means having at least one attached chemical group such as, for example, alkyl group, alkenyl group, vinyl group, hydroxyl group, alkoxy group, carboxylic acid group, other functional groups, and combinations thereof.

As used herein, vinyl aromatic monomers are vinyl monomers in which one or more of $R^1$, $R^2$, $R^3$, and $R^4$ contains one or more aromatic ring.

A monovinyl monomer is a vinyl monomer that has exactly one non-aromatic carbon-carbon double bond per molecule. A multivinyl monomer is a vinyl monomer that has two or more non-aromatic carbon-carbon double bonds per molecule.

A polymer in which 90 mole % or more of the polymerized units are polymerized units of one or more vinyl monomer is a vinyl polymer.

A collection of particles is characterized by the diameters of the particles. If particle is not spherical, the diameter of the particle is considered to be the diameter of a particle having the same volume as the particle. A collection of particles is characterized herein by the volume-average diameter of the collection.

As used herein oleum is a mixture that contains sulfuric acid. Oleum is made by mixing sulfuric acid with sulfur trioxide. It is assumed that sulfuric acid reacts with sulfur trioxide to form pyrosulfuric acid ($H_2S_2O_7$). It is considered that if water were added to oleum, each mole of water would react with one mole of pyrosulfuric acid to form two moles of sulfuric acid. The "concentration" of a sample of oleum is taken to be the weight of sulfuric acid that would be present if sufficient water were added to the sample of oleum to convert all of the pyrosulfuric acid to sulfuric acid, as a percentage based on the weight of the sample of oleum. By this definition, the "concentration" of oleum can be greater than 100%. Another way to characterize oleum is the parameter "% oleum," which considers that each sample of oleum can be characterized as a reaction product of X grams of sulfuric acid and Y grams of sulfur trioxide. The parameters X and Y are uniquely determined by the composition of the sample of oleum. Then "% oleum" is 100*Y/(X+Y).

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when a ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The present invention involves the use of solid particles (herein called "solid particles (B)") having BET surface area of 50 m²/g to 5,000 m²/g and having volume-average particle diameter of 50 µm or less. Preferably, particles (B) have surface area of 100 or more m2/g; more preferably 200 or more m2/g, more preferably 500 or more m2/g, more preferably 800 or more m2/g. Preferably, particles (B) have surface area of 2,500 m2/g or less.

The volume average particle diameter of the solid particles (B) is 200 µm or less; more preferably 100 µm or less; more preferably 50 µm or less; more preferably 20 µm or less. Preferably, the volume average particle diameter of the solid particles (B) is 0.01 µm or greater; more preferable 0.02 µm or greater.

Preferred solid particles (B) are resin particles or activated carbon particles or a mixture thereof. Preferably, solid particles (B) are particles of activated carbon. Preferred is powdered activated carbon.

When solid particles (B) are resin particles, preferably the resin particles are selected from high-DVB resins, post-crosslinked resins, and pyrolized resins. High-DVB resins have polymerized units of divinyl benzene (DVB) in the amount of, by weight based on the weight of the high-DVB resin, 50% or more; more preferably 60% or more; more preferably 70% or more; more preferably 80% or more. Post-crosslinked resins are produced by copolymerization of monomers including styrene and DVB; the resulting copolymer is then subjected to a crosslinking reaction, preferably by a Friedel-Crafts reaction to create methylene bridge crosslinks. Pyrolized resins are produced by copolymerization of monomers including styrene and DVB; the resulting copolymer is contacted with sulfuric acid to add sulfonate groups to the copolymer to form a sulfonated resin; and the sulfonated resin is then pyrolized. Resin particles are preferably made by suspension polymerization. Optionally, after suspension polymerization, resin particles may be subjected to a mechanical process such as grinding to reduce the volume-average particle diameter.

In the process of the present invention, sulfuric acid is brought into contact with solid particles (B). Preferably the sulfuric acid is present as a solution of sulfuric acid, water, and additional impurities (herein the "pre-treatment solution"). Preferably, the pre-treatment solution is brought into contact with the solid particles (B) to make a treatment mixture. Preferably, the treatment mixture is agitated sufficiently to provide good contact between the particles of solid particles (B) and the pre-treatment solution.

Preferably, the concentration of sulfuric acid in the pre-treatment solution is, by weight based on the weight of the pre-treatment solution, 0.1% or more; more preferably 0.3% or more; more preferably 1% or more; more preferably 3% or more; more preferably 10% or more. Preferably, the concentration of sulfuric acid in the pre-treatment solution is, by weight based on the weight of the pre-treatment solution, 99% or less; more preferably 95% or less. Preferably, the concentration of water in the pre-treatment solution is, by weight based on the weight of the pre-treatment solution, 1% or more; more preferably 5% or more. Preferably, the concentration of water in the pre-treatment solution is, by weight based on the weight of the pre-treatment solution, less than 100%; more preferably 99% or less; more preferably 95% or less. In some embodiments, the concentration of sulfuric acid in the pre-treatment solution is, by weight based on the weight of the pre-treatment solution, 85% or greater. In some embodiments, the concentration of sulfuric acid in the pre-treatment solution is, by weight based on the weight of the pre-treatment solution, 50% or less.

Preferably, the amount of all compounds other than water and sulfuric acid in the pre-treatment solution is, by weight based on the weight of the pre-treatment solution, 10% or less; more preferably 5% or less.

Preferably, the weight ratio of pre-treatment solution to solid particles (B) is 5:1 or higher; more preferably 10:1 or higher; more preferably 20:1 or higher; more preferably 50:1 or higher. Preferably, the weight ratio of pre-treatment solution to solid particles (B) is 2000:1 or lower; more preferably 1000:1 or lower; more preferably 500:1 or lower.

Preferably, after agitation of the treatment mixture, the sulfuric acid is separated from the solid particles (B). One suitable method of separating sulfuric acid from the solid particles (B) is to make a purification mixture of the treatment mixture with diatomaceous earth, then place that purification mixture on top of a filter medium, and then pull sulfuric acid through the filter medium, for example by the combined action of gravity and partial vacuum, leaving both the solid particles (B) and the diatomaceous earth on top of the filter medium.

A preferred source of sulfuric acid for use in the present invention is spent sulfuric acid that is the result of a reaction between sulfuric acid and a copolymer (A). Preferred resins for copolymer (A) are vinyl polymers. Among vinyl polymers, preferred are two types of vinyl polymers, herein labeled "AN polymers" and "vinyl aromatic polymers."

AN polymers are vinyl polymers that contain polymerized units of acrylonitrile or methacrylonitrile or a combination thereof. Preferred AN polymers have no polymerized units of any vinyl aromatic monomer. Among AN polymers, preferably the amount of polymerized units of acrylonitrile and methacrylonitrile is, by weight based on the weight of the AN polymer, 50% or more; more preferably 75% or more; more preferably 95% or more. Among AN polymers, most preferred is poly(acrylonitrile) homopolymer.

Among vinyl polymers, vinyl aromatic polymers are preferred for copolymer (A). Among vinyl aromatic polymers, preferably the amount of polymerized units of vinyl aromatic monomer, by weight based on the weight of the resin, is 50% or more, more preferably 75% or more; more preferably 85% or more; more preferably 95% or more; more preferably 99% or more. Preferred vinyl aromatic monomers are styrene, alkyl styrenes, alpha-alkyl styrenes, and divinyl benzene; more preferred are styrene and divinyl benzene. Among vinyl aromatic polymers, preferably the amount of polymerized units of styrene plus the amount of polymerized units of divinyl benzene is, by weight based on the weight of the resin, is 40% or more, more preferably 65% or more; more preferably 75% or more; more preferably 85% or more. Preferably, the amount of polymerized units of divinyl benzene, by weight based on the weight of the resin, is 10% or more; more preferably 20% or more.

Preferred vinyl polymers have polymerized units of one or more multivinyl monomer. Preferably, the amount of polymerized units of multivinyl monomer, by weight based on the weight of the vinyl polymer, is 0.5% or more; more preferably 1% or more; more preferably 2% or more. Preferably, the amount of polymerized units of multivinyl monomer, by weight based on the weight of the vinyl polymer, is 100% or less; more preferably 90% or less.

When spent sulfuric acid is produced by reaction of sulfuric acid with copolymer (A), the copolymer (A) is preferably in the form of a collection of particles. Preferably, the volume average particle size is greater than 200 µm; more preferably 250 µm or greater; more preferably 300 µm or greater. Preferably, the volume average particle size is 2 mm or smaller; more preferably 1 mm or smaller.

When spent sulfuric acid is produced by reaction of sulfuric acid with copolymer (A), preferably after the reaction mixture containing the sulfuric acid and the copolymer (A) has been heated to a holding temperature for time, the reaction between the sulfuric acid and the resin is considered to be complete or as complete as desired, and that time is considered the termination time. Preferably, after termination time is reached, the reaction mixture is cooled to a temperature below 100° C. Preferably, after the termination time is reached, relatively dilute sulfuric acid is added to the reaction mixture. The "relatively dilute sulfuric acid" is a solution of sulfuric acid in water that has lower weight ratio of sulfuric acid to water than the weight ratio of sulfuric acid to water that is found in the reaction mixture at the termination time. Solution of sulfuric acid in water may or may not be removed from the reaction mixture prior to addition of further dilute sulfuric acid and/or water. Preferably, after dilute sulfuric acid is added, water is added. It is contemplated that cooling the reaction mixture, adding relatively dilute sulfuric acid, and adding water all serve to quench the reaction between resin and sulfuric acid.

When spent sulfuric acid is produced by reaction of sulfuric acid with copolymer, preferably, after the reaction between the sulfuric acid and the copolymer has been conducted, the resin is separated from the sulfuric acid, and from some or all of the water that may be present.

Solutions of sulfuric acid in water may be removed from the reaction mixture and become "spent" sulfuric acid and used as the pre-treatment solution of the present invention. The solution of sulfuric acid in water that becomes the pre-treatment solution may be removed from the reaction mixture before addition of dilute sulfuric acid or may be removed from the reaction mixture after one or more addition of dilute sulfuric acid and/or water. Various solutions of sulfuric acid in water may be removed from the reaction mixture, and these various solutions may have various concentrations of sulfuric acid. Any of such solutions, or any mixture of them, may be used as the pre-treatment solution in the present invention.

In some embodiments, a solution of sulfuric acid in water is separated from the reaction mixture, and that solution of sulfuric acid in water has concentration, by weight based on the weight of the solution of sulfuric acid in water, of greater than 80% to 100%. In some embodiments, such a solution of sulfuric acid in water becomes the pre-treatment solution of the present invention.

In some embodiments, a solution of sulfuric acid in water is separated from the reaction mixture, and that solution of sulfuric acid in water has concentration, by weight based on the weight of the solution of sulfuric acid in water, of 0.1% to 80%. In some embodiments, such a solution of sulfuric acid in water becomes the pre-treatment solution of the present invention.

While the present invention is not limited to any specific theory, it is contemplated that impurities in the spent sulfuric acid include molecules that impart color to the sulfuric acid. It is contemplated that the color-causing molecules transfer from the sulfuric acid to the solid particles (B).

The following are examples of the present invention.

The activated carbon was NORIT™ powdered activated carbon from Cabot Corporation.

EXAMPLE 1: WITH AND WITHOUT ACTIVATED CARBON

The sulfuric acid that was treated was spent sulfuric acid produced by treatment of a resin that was a copolymer containing polymerized units of styrene and divinyl benzene. The spent sulfuric acid contained water and other impurities. In each sample, 50 mL of spent sulfuric acid was used. Powdered activated carbon was added and the mixture was shaken by hand. The carbon was allowed to settle, and the liquid on the top of the container was observed visually. Results were as follows:

Results were as follows:

| Example | Activated Carbon (g) | Color |
|---|---|---|
| 1-1-C[(1)] | 0 | dark brown, opaque |
| 1-2 | 0.33 | clear to light yellow, transparent |

| Example | Activated Carbon (g) | Color |
|---|---|---|
| 1-3 | 0.66 | clear to light yellow, transparent |
| 1-4 | 1.0 | clear to light yellow, transparent |

[(1)]Example 1-1-C is a comparative example

The use of activated carbon significantly reduced the color of the sulfuric acid.

COMPARATIVE EXAMPLE 2: WITH AND WITHOUT ADSORBENT RESIN

An experiment similar to Example 1 was performed twice, each time with a different commercial Optipore™ resin used in place of activated carbon. Each Optipore™ resin used was a synthetic resin that is highly porous compared to other synthetic resins and each has volume-average particle diameter larger than 250 μm. No significant difference in color was observed among the samples. The Optipore™ resin had volume-average particle diameter greater than 200 μm.

COMPARATIVE EXAMPLE 3: WITH AND WITHOUT DIATOMACEOUS EARTH

An experiment similar to Example 1 was performed with diatomaceous earth used in place of activated carbon. No significant difference in color was observed among the samples. Diatomaceous earth is known to have BET surface area less than 50 $m^2/g$.

EXAMPLE 4: SEPARATION OF SULFURIC ACID

A mixture of spent sulfuric acid and powdered activated carbon (similar to sample 1-2) was mixed with diatomaceous earth. The resulting mixture was placed in a vacuum funnel. Partial vacuum was pulled on the bottom of the vacuum funnel, and clear, light yellow sulfuric acid was pulled through the funnel, while the activated carbon and the diatomaceous earth were retained on the funnel.

The invention claimed is:

1. A method for treating sulfuric acid comprising the step (I) of bringing said sulfuric acid into contact with a collection of solid particles (B) having BET surface area of 50 $m^2/g$ to 5,000 $m^2/g$ and having volume-average particle diameter of 200 μm or less.

2. The method of claim 1, wherein said solid particles (B) are activated carbon particles.

3. The method of claim 2, wherein said sulfuric acid, prior to said step (I), has undergone a reaction with a copolymer.

4. The method of claim 2, wherein said sulfuric acid is in the form of a solution that comprises sulfuric acid and water.

5. The method of claim 2, wherein said activated carbon particles are powdered activated carbon particles.

6. The method of claim 2, wherein said method further comprises the step, after said step (I), of separating said sulfuric acid from said activated carbon particles.

* * * * *